Aug. 30, 1927.　　　　　　　　　　　　　　　　1,640,514
F. C. H. MÜLLER
PRESS FOR FORMING PLASTIC MATERIALS
Filed May 1, 1924　　　3 Sheets-Sheet 2
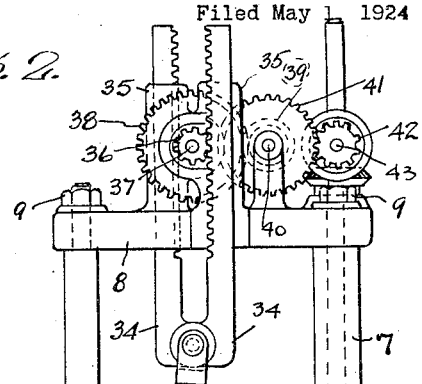
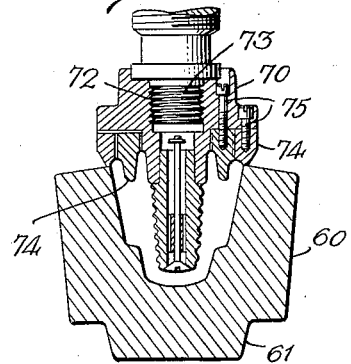
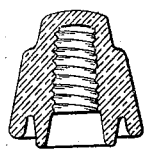
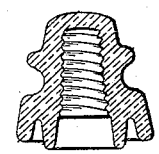
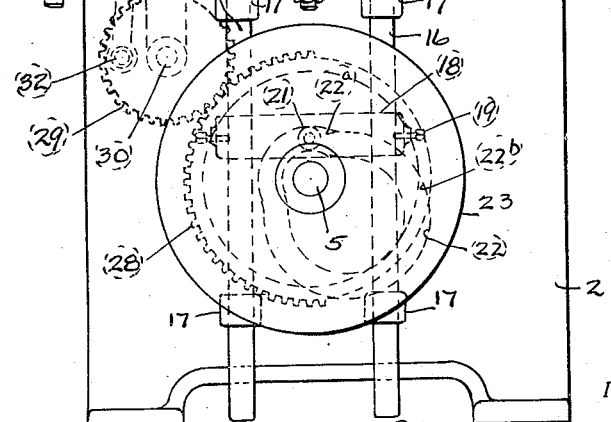
INVENTOR.
Ferdinand C. H. Müller
BY
Pay, Oberlin & Pay
ATTORNEYS Patented Aug. 30, 1927.

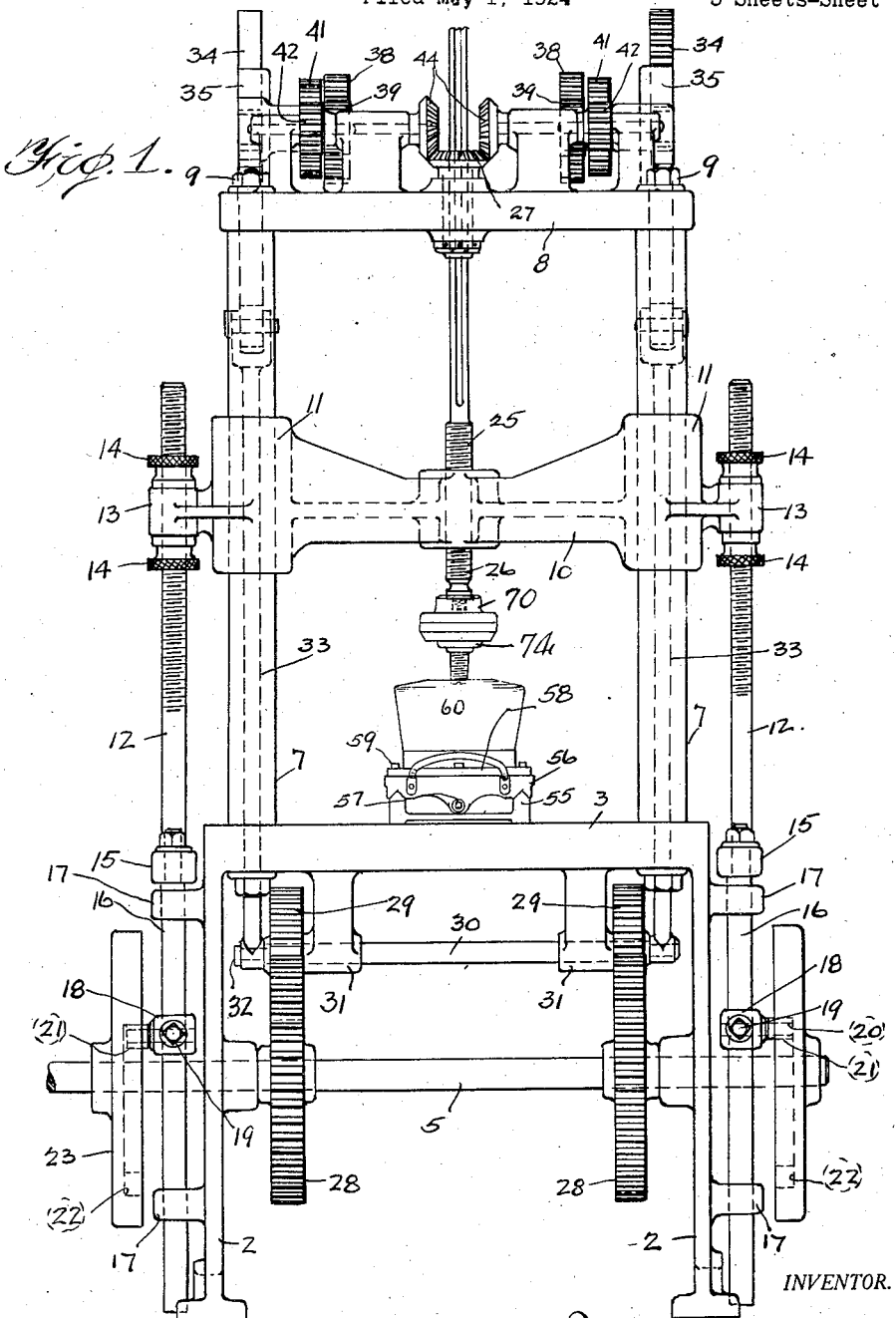

1,640,514

UNITED STATES PATENT OFFICE.

FERDINAND C. H. MÜLLER, OF FINDLAY, OHIO, ASSIGNOR TO THE FINDLAY ELECTRIC PORCELAIN COMPANY, OF FINDLAY, OHIO, A CORPORATION OF OHIO.

PRESS FOR FORMING PLASTIC MATERIALS.

Application filed May 1, 1924. Serial No. 710,232.

The present invention relates to a machine for pressing articles from plastic material and more paticularly relates to a machine for forming porcelain insulators and the like articles requiring the formation of a hollow threaded interior.

The principal features of the present machine include a positive drive for the plunger and the provision of a male die member so carried and rotated as to make the necessary number of revolutions during the downward movement to form the threads in the plastic material and to reverse such rotation so as to be readily withdrawn without injury to the formed article.

The annexed drawing and the following description set forth in detail certain mechanism embodying the invention, such disclosed means constituting, however, but one of various mechanical forms in which the principle of the invention may be used.

In said annexed drawing:—

Figure 3:
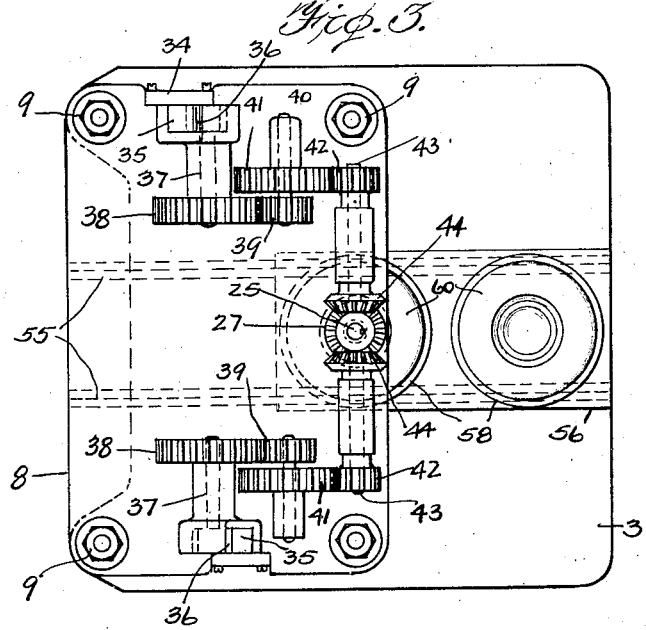
Figure 4:
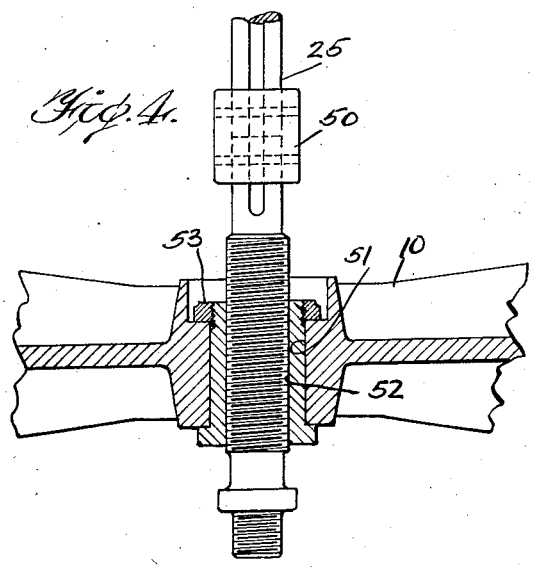

Fig. 1 is a front elevational view of the machine; Fig. 2 is a side elevational view thereof; Fig. 3 is a top plan view of the spindle rotating mechanism; Fig. 4 is an enlarged sectional view of a detail showing the method of mounting the rotatable spindle; Fig. 5 is a sectional view through the spindle end mold and die; and Figs. 6 and 7 are sectional views through two forms of insulators such as are pressed by the present apparatus.

The present machine has a suitable base with side supporting members 2 and a suitable platform or table 3. Mounted in the base is a main power driven shaft 5 carried in suitable bearings in the supports 2. On the sides of the frame are two upright guide members 6 and two other supporting posts 7 which at their upper ends carry a supporting plate 8 which fits over the reduced ends of the guides and posts and is held thereon by nuts and washers 9. The movable cross-head 10 has two side bearing sleeves 11 surrounding the guide posts 6 and movable therealong.

The driving mechanism for the vertical reciprocating movement of the cross-head is by means of two rods 12 extending through hollow bosses 13 on the cross-head ends and adjustably secured thereto by means of locking nuts 14. Each rod is fastened at its lower end to a yoke 15, each yoke having a pair of downwardly extending guide rods 16 mounted in suitable bearing bosses 17 on the side supports 2 of the base. Each pair of rods 16 is provided at about their middle with a connecting yoke 18 adjustably secured thereto by set screws 19 or in any suitable manner. These connecting yokes are each provided with a pin 20 having a roller 21 extending into a cam groove 22 formed in a cam wheel 23 suitably secured on the main driving shaft 5 in the base.

The die carrying spindle 25 has its portion threaded as at 26, which threaded portion engages in a threaded bore in the center portion of the reciprocating cross-head, and this spindle extends upwardly through the upper supporting plate 8, the upper portion of the spindle having a keyway 90 to slidably receive a key fixed in a driving bevel gear 27 mounted on a suitable bearing in the plate.

The drive for the spindle is obtained through two large mutilated gears 28 mounted on the shaft 5 inside of the supports 2 and these gears are adapted to mesh with two smaller spur gears 29 rotating on a sub-shaft 30 carried by two brackets 31 from the bottom of the table. These gears 29 are provided with eccentric cranks or pins 32 to which are attached the lower ends of connecting rods 33, having their upper ends pivotally attached to one end of racks 34 slidably mounted in guides 35 carried by the upper supporting plate 8. Each rack drives a small spur gear 36 which is secured on a short shaft 37 having a gear 38 on the other end. The gears 38 mesh with other gears 39 on a second stub shaft 40 and through a second pair of gears 41 and 42 drive a third shaft 43. Each of the shafts 43 has at one end a bevel gear 44 in mesh with the spindle driving bevel gear 27. These two gears 44 both drive the spindle gear, the correct direction of rotation of the bevel gears 44 being obtained by having the two racks mounted on opposite sides of the small gears 36.

The direction of rotation of the spindle is reversed as the gears 29 rotate, each full rotation of the gear 29 forming a complete cycle for the spindle. This cycle is accomplished as best shown in Fig. 2 in one-half of one revolution of the large mutilated gear, and that is during one-half of the complete cycle of the cross head for the die. As readily seen from Fig. 2, the cam groove 22 is formed from two meeting grooves 22$^a$ and 22$^b$, each using up one-half of a revolution of the cam wheel and sheave shaft.

The position of the gear teeth on the mutilated gears is such that the spindle starts to revolve and move downwardly through the head when the pin starts into the portion 22ª of the cam groove which is the portion of small diameter, at which time the cross head reaches its lower limit of travel. As the portion 22ª extends for 180 degrees around the axis of the wheel, the spindle will move downwardly, change direction of rotation and move to its upper limit by the time the pin moves out of the groove 22ª into the portion 22ᵇ of the groove.

The male die carried by the spindle consists of a cylindrical member 70 having a threaded bore 72 which has threaded engagement with the lower end 73 of the spindle and this member 70 is provided with forming rings 74 which are secured thereto by means of screws 75 or the like. In the lower end of the member 70 is mounted the threaded forming extension of the die.

To provide for the easy removal and adjustment of the spindle and die, it is necessary to have the screw threads on the spindle in the cross head correspond to the threaded die extension so that when the die is rotated in and out of the plastic material, the movement of the die, due to its rotation in the cross head, will be the same as the pitch of the threads formed.

To accomplish this result, the spindle is split transversely just above the cross head, the two parts being removably connected together in a coupling sleeve 50. The cross head has a central hollow boss 51 in which is removably mounted an interiorly threaded removable bushing 52 held in position by means of a nut 53 at the top which securely locks the bushing in place. The lower portion of the spindle is changed as necessary and each lower portion is provided with its own bushing having threads corresponding with those of the die being used.

The table of the machine is provided with two guides 55 on which is mounted a sliding mold carrier 56 having a handle at each end and provided with a stop screw 57 at each end so that the movement of the carrier may be set. This carrier as shown has two mold cavities or supporting members 58 secured to the slides by bolts 59 or the like and the molds 60 are mounted in the cavities, the molds having an extension 61 on the bottom to fit therein. This allows the machine to be continuously operated as the slide is moved back and forth, two operators being employed, one on each side of the table. In Fig. 5 a mold is shown in section and in Fig. 6 is shown in section an insulator as formed in such a mold. Fig. 7 illustrates a slightly different form of insulator and it is of course obvious that an insulator of this type would have to be made on a split mold.

The present machine provides a positive drive for the cross head and for the rotating spindle and at the same time provides for accurate timing of the two movements. The height of the cross head may be easily adjusted for various mold heights and the position of the spindle and die therein is likewise easily adjustable. Change of dies and spindles for different threads is readily made and the correct relation maintained by substitution of short threaded spindle ends. The rotary spindle drive is accomplished through two sets of driving gears thus equalizing pressures on the final bevel gear and reducing wear and friction.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a die pressing machine, the combination of a base having a mold table, vertical guideways with a platform at the top, a reciprocable cross-head mounted in said guideways, a die carrying spindle slidably mounted through said platform and passing through said crosshead and having threaded engagement therewith, a main driving shaft in said base, positive driving connections between said main shaft and said cross-head for reciprocating the latter, and other positive driving means connecting said main shaft and said spindle for rotating the latter.

2. In a die pressing machine, the combination of a base having a mold table, vertical guideways with a platform at the top, a reciprocable cross-head mounted in said guideways, a die carrying spindle slidably mounted through said platform and passing through said cross-head and having threaded engagement therewith, a main driving shaft in said base, positive driving connections between said main shaft and said cross-head for reciprocating the latter, said connections being adapted to maintain said cross-head in its lowered position during a portion of a cycle, other positive driving connections between said main shaft and said spindle and adapted to rotate the latter during the stationary position of said cross-head.

3. In a die pressing machine, the combination of a base having a mold table, vertical guideways with a platform at the top, a reciprocable cross-head mounted in said guideways, a die carrying spindle slidably mounted through said platform and passing through said cross-head and having threaded engagement therewith, a main driving shaft in said base, positive driving connections between said main shaft and said cross-head for reciprocating the latter, said connections being adapted to maintain said cross-head in its lowered position during a portion of a cycle, other positive driving connections between said main shaft and said spindle and adapted to rotate said spindle first in one direction and then in the other only during the stationary position of said cross-head.

4. In a die pressing machine, the combination of a base having a mold table, vertical guideways with a platform at the top, a reciprocable cross-head mounted in said guideways, a die carrying spindle slidably mounted through said platform and passing through said cross-head and having threaded engagement therewith, a main driving shaft in said base, positive driving connections between said main shaft and said cross-head for reciprocating the latter, said connections including a reciprocatory slide and connecting rods to said cross-head, a grooved cam wheel operatively engaging said slide, said wheel having its grooves so arranged as to accomplish one complete reciprocation during one-half revolution and to maintain the cross-head in its lowered position during the other half revolution, and other positive driving connections from said main shaft to said spindle to rotate said spindle first in one direction and then in the other to reciprocate said spindle through said cross-head, such independent spindle reciprocation taking place during the maintaining of said cross-head in its lowered position.

5. In a die pressing machine, the combination of a base having a mold table, vertical guideways with a platform at the top, a reciprocable cross-head mounted in said guideways, a die carrying spindle slidably mounted through said platform and passing through said cross-head and having threaded engagement therewith, a main driving shaft in said base, positive driving connections between said main shaft and said cross-head for reciprocating the latter, said connections including a reciprocatory slide and connecting rods to said cross-head, a grooved cam wheel operatively engaging said slide, said wheel having its grooves so arranged as to accomplish one complete reciprocation during one-half revolution and to maintain the cross-head in its lowered position during the other half revolution, and other positive driving connections from said main shaft to said spindle to rotate said spindle first in one direction and then in the other to reciprocate said spindle through said cross-head, said driving connections for said spindle including a mutilated gear on said driving shaft, a second mutilated gear on a stub shaft, a vertically movable rod and rack and pinion gearing connected to said spindle driving gear and adapted to accomplish continuous driving of said spindle in both directions during the one-half revolution of said main shaft corresponding to the lowered or stationary position of said cross-head.

6. In a pressing machine, the combination of a cross-head having a central boss, a bushing removably mounted therein and having a threaded bore, a die-holding spindle rotatably mounted in said bore and removable with said bearing.

7. In a pressing machine, the combination of vertical guideways having a platform at the top, a gear train on said platform terminating in a bevel gear with a key, a reciprocatory cross-head mounted in said guideways and having a hollow central boss, an interiorly threaded bearing removably mounted in said boss, a die-carrying spindle section having threaded engagement with said bearing and a spindle having a keyway slidably mounted through said bevel gear and adapted to be rotated thereby, and a coupling connecting the adjacent ends of said squared spindle and said die-carrying section.

Signed by me, this 28 day of April, 1924.

FERDINAND C. H. MÜLLER.